(12) United States Patent
Chaya

(10) Patent No.: US 6,737,190 B2
(45) Date of Patent: May 18, 2004

(54) ELECTRONIC APPARATUS

(75) Inventor: Masahiko Chaya, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 299 days.

(21) Appl. No.: 09/834,813

(22) Filed: Apr. 13, 2001

(65) Prior Publication Data

US 2002/0022404 A1 Feb. 21, 2002

(30) Foreign Application Priority Data

Apr. 27, 2000 (JP) ........................................ 2000/128036

(51) Int. Cl.[7] ................................................. H01M 2/10
(52) U.S. Cl. ........................ 429/100; 429/96; 224/908; 206/316.2; 320/162
(58) Field of Search .................... 429/96, 100; 224/908; 206/316.2; 320/162

(56) References Cited

U.S. PATENT DOCUMENTS 5,805,440 A * 9/1998 Maeshima et al. .......... 363/146

FOREIGN PATENT DOCUMENTS

JP 2664952 3/1990

* cited by examiner

Primary Examiner—Bruce F. Bell
(74) Attorney, Agent, or Firm—Robin, Blecker & Daley

(57) ABSTRACT

In an electronic apparatus in which a battery or a battery pack having a battery cell and a protection circuit packed therein is loaded, as a driving electric power source, in a battery chamber of the body of the electronic apparatus, a DC coupler having the shape similar to the battery or the battery pack is loaded into the battery chamber, and the plug connection through a plug-inserting hole provided on an arbitrary position of the electronic apparatus is performed for supplying external electric power.

13 Claims, 2 Drawing Sheets

ELECTRONIC APPARATUS

BACKGROUND OF THE INVENTION

1. Field of the Invention

The present invention relates to the structure of, for example, a small portable apparatus arranged to be battery-driven, to which external electric power is supplied.

2. Description of Related Art

Heretofore, as electronic apparatuses arranged to be battery-driven, there are, for example, video camcorders, digital still cameras, etc. These apparatuses are arranged to be supplied with external electric power by being equipped with a dedicated electric power supplying part. Therefore, the reduction in size of the electronic apparatus is hindered. Further, since it is necessary that a cable for supplying electric power is connected to the side surface of the body of the electronic apparatus, the appearance of the electronic apparatus becomes unseemly.

BRIEF SUMMARY OF THE INVENTION

In view of the above situation, it is an object of the invention to provide an electronic apparatus having the structure for supplying electric power, which is capable of solving the above problem.

To attain the above object, in accordance with an aspect of the invention, there is provided an electronic apparatus, comprising a battery chamber arranged to house therein a battery for supplying electric power to the electronic apparatus, the battery chamber being capable of housing therein, in place of the battery, a coupler for supplying external electric power, and a lid arranged to close an insertion opening from which to insert the battery or the coupler into the battery chamber, the lid having an insertion hole through which to connect a plug for supplying external electric power to a jack of the coupler.

The above and further objects and features of the invention will become apparent from the following detailed description of a preferred embodiment thereof taken in conjunction with the accompanying drawings.

DETAILED DESCRIPTION OF THE INVENTION

Hereinafter, a preferred embodiment of the invention will be described in detail with reference to the drawings.

Figure 1:
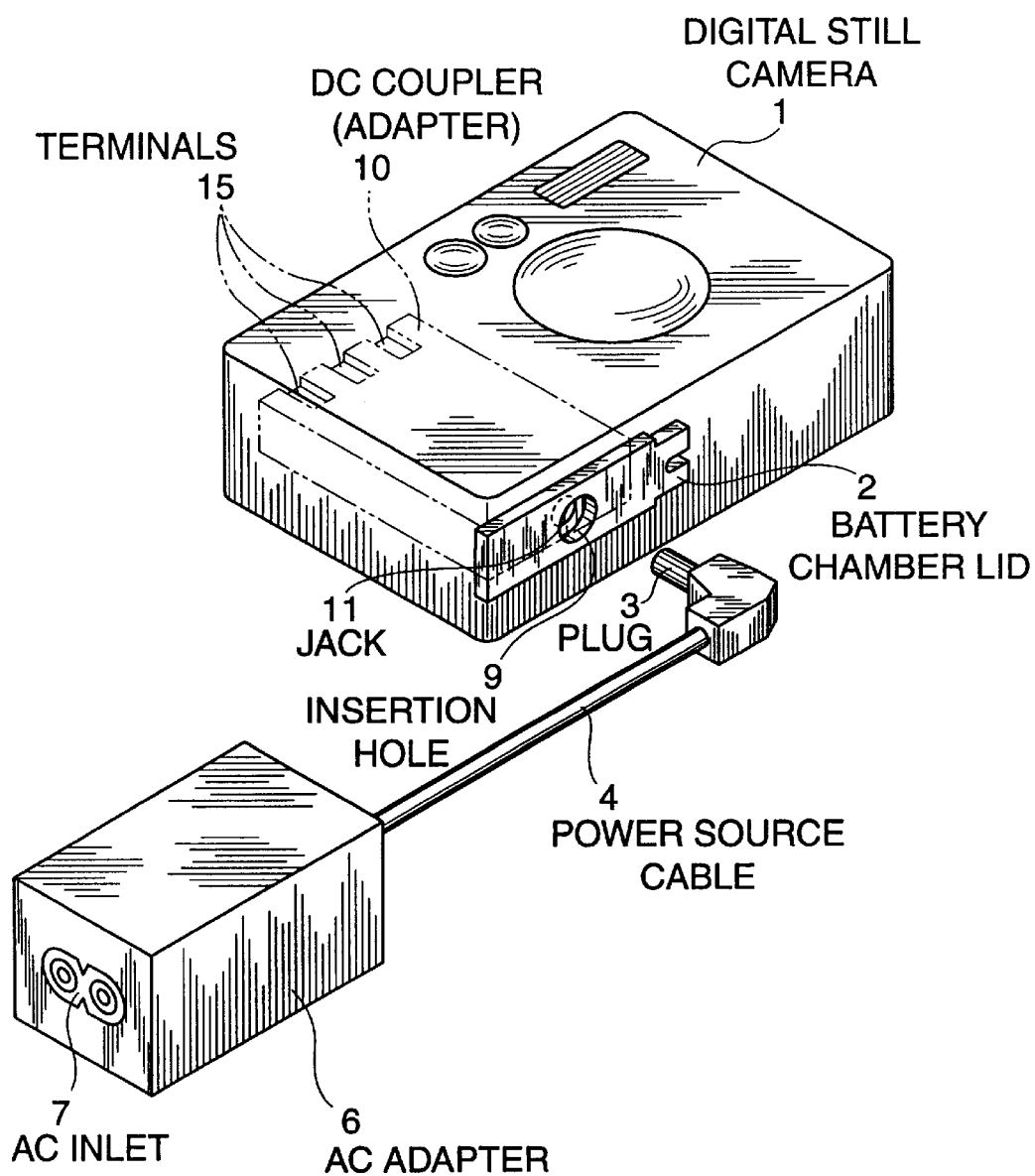
FIG. 1 is a perspective view showing a structure for supplying electric power to an electronic apparatus, according to an embodiment of the invention.

FIG. 1 is a perspective view showing a structure for supplying electric power to an electronic apparatus, according to the embodiment of the invention. Referring to FIG. 1, the structure includes a battery chamber (not shown) of the electronic apparatus 1 (in the example shown in FIG. 1, a digital still camera), a battery chamber lid 2 disposed on the bottom surface of the electronic apparatus 1 and arranged to close the battery chamber, a pseudo-battery-type adapter (hereinafter referred to as "DC coupler") 10 inserted into the battery chamber, terminals 15 provided on the DC coupler 10, an AC adapter 6 for converting AC power to DC power, and a plug 3 for supplying DC power from the AC adapter 6. The AC power supply is used by connecting a cable having an AC power supply outlet (not shown) to an AC inlet 7 of the AC adapter 6.

The electronic apparatus 1 is ordinarily used with a battery pack (not shown) of the similar shape as that of the DC coupler 10 inserted into the battery chamber. When the electronic apparatus 1 is driven with an AC power source used, the DC coupler 10 of the above-mentioned shape is inserted into the battery chamber from the direction of the bottom surface of the electronic apparatus 1. Then, the battery chamber lid 2, which is arranged to close a battery-inserting opening portion of the battery chamber, is closed. Then, the plug 3, which is provided for supplying AC power, is connected, through an insertion hole 9 formed in the battery chamber lid 2, to a jack 11 disposed on the DC coupler 10. As a result, electric power is supplied to the electronic apparatus 1 through the terminals 15.

According to the above-described structure, since the jack 11 is not required to be disposed on the body of the electronic apparatus 1, it becomes easy to reduce the size of the body of the electronic apparatus 1. Further, it becomes possible for the user who has no use for the driving by AC power to utilize an electric power supplying device, such as a general-purpose AC adapter, which has no unnecessary functions and is more inexpensive and small in size.

Figure 2:
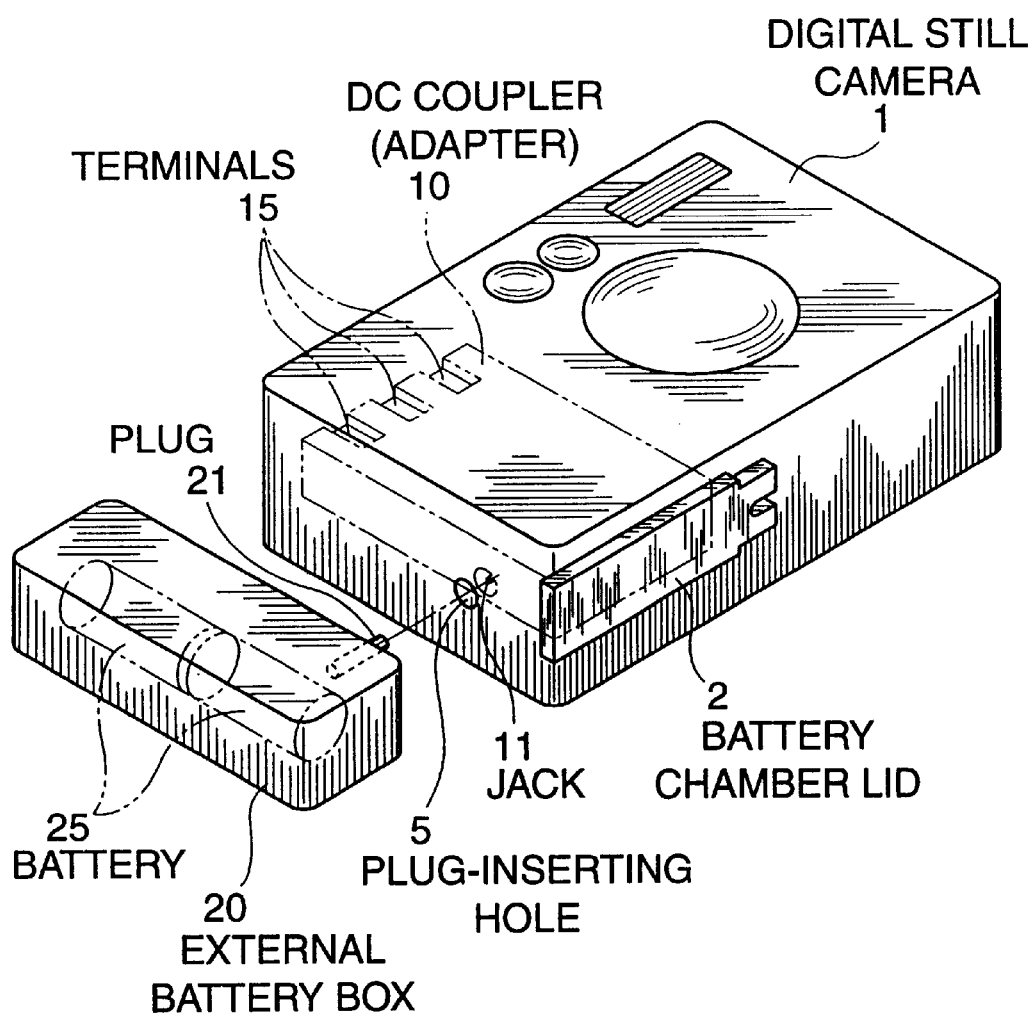
FIG. 2 is a perspective view showing another structure for supplying electric power to an electronic apparatus, according to the embodiment of the invention.

FIG. 2 is a perspective view showing another structure for supplying electric power to an electronic apparatus, according to the embodiment of the invention. Referring to FIG. 2, the structure includes a battery chamber (not shown) of the electronic apparatus 1 (in the example shown in FIG. 2, a digital still camera), a plug-inserting hole 5 formed in the side surface of the electronic apparatus 1 and extending to the battery chamber, a DC coupler 10 inserted into the battery chamber, an external battery box 20, and a plug 21 provided on the external battery box 20 for supplying DC power.

Electric power is supplied from a battery 25 loaded in the external battery box 20 to the electronic apparatus 1 through the terminals 15 with the plug 21 connected through the plug-inserting hole 5 to a jack 11 provided on the DC coupler 10 inserted in the battery chamber.

According to the above-described structure, when the battery 25, which has a larger capacity, is loaded in the external battery box 20 and the external battery box 20 is mounted on the electronic apparatus 1 (a mounting portion or a mounting means being not shown), since there exits the degree of freedom of the disposition of the jack 11 on the DC coupler 10, with the plug-inserting hole 5 extending to the battery chamber (not shown) being provided in such an arbitrary position as to be able to reach the battery chamber, it becomes possible to increase the degree of disposition of the external battery box 20.

Accordingly, while, in FIG. 2, the electronic apparatus 1 is arranged to have the external battery box 20 mounted on the side surface thereof, in a case where the battery chamber lid 2 having the insertion hole 9 shown in FIG. 1 is provided on the electronic apparatus 1, the external battery box 20 is mountable on the bottom surface of the electronic apparatus 1. In a case where a plurality of plug-inserting holes 5 are provided (on the battery chamber lid 2 and the exterior surface of the body of the electronic apparatus 1) and a plurality of jacks 11 are provided on the DC coupler 10, a plurality of kinds of external battery boxes 20 in which batteries different in capacity are respectively loaded are selectively usable.

Further, as also mentioned in the foregoing, in the electronic apparatus 1 shown in FIG. 2, a plurality of jacks 11 provided on the DC coupler 10 for connection with an external electric power supplying device may be disposed at arbitrary positions, and a plurality of plug-inserting holes 5 corresponding to the positions of the plurality of jacks 11 may be disposed at such positions as to be able to reach the battery chamber (not shown). The external electric power supplying device includes a device capable of selectively using AC power or DC power.

Further, the DC coupler 10 may contain therein a secondary battery, a protection circuit therefor, a current and voltage control circuit for charging, etc. In a case where a secondary battery is contained in the DC coupler 10, the charging of the second battery contained in the DC coupler 10 becomes possible only by inserting the plug 3 into the insertion hole 9, which is convenience.

As has been described above, according to the embodiment, the structure for supplying electric power from an external power source is improved, so that a restriction on the design of the electronic apparatus can be reduced, thereby further reducing the size of the electronic apparatus.

What is claimed is:

1. An electronic apparatus, comprising:
   a battery chamber arranged to house therein a battery for supplying electric power to said electronic apparatus, said battery chamber being capable of housing therein, in place of the battery, a coupler having a jack; and
   a lid arranged to close an insertion opening from which to insert the battery or the coupler into said battery chamber,
   wherein said apparatus having an insertion hole through which to connect a plug for supplying external electric power to the jack of the coupler.

2. An electronic apparatus according to claim 1, wherein said lid is disposed on a bottom surface of said electronic apparatus.

3. An electric apparatus, comprising
   a battery chamber arranged to house therein a battery for supplying electric power to said electronic apparatus, said battery chamber being capable of housing therein, in place of the battery, a secondary battery having a jack; and
   a lid arrranged to close an insertion opening from which to insert the battery or the secondary battery into said battery chamber;
   wherein said apparatus having an insertion hole through which to connect a plug for supplying external electric power to the jack of the secondary battery.

4. An electric apparatus comprising:
   a battery chamber arranged to house therein a battery for supplying electric power to said electric apparatus, said battery chamber being capable of housing therein, in place of the battery, a coupler having a jack; and
   a lid arranged to close an insertion opening from which to insert the battery or the coupler into said battery chamber;
   wherein said lid having an insertion hole through which to connect a plug for supplying external electric power to the jack of the coupler.

5. An electric apparatus comprising:
   a battery chamber arranged to house therein a battery for supplying electric power to said electric apparatus, said battery chamber being capable of housing therein, in place of the battery, a secondary battery having a jack; and
   a lid arranged to close an insertion opening from which to insert the battery or the secondary battery into said battery chamber,
   wherein said lid having an insertion hole through which to connect a plug for supplying external electric power to the jack of the secondary battery.

6. An electric apparatus, comprising:
   a chamber arranged to house therein a coupler having a jack; and
   a lid arranged to close an insertion opening from which to insert the coupler into said chamber,
   wherein said lid having an insertion hole through which to connect a plug for supplying external electric power to the jack of the coupler.

7. An electric apparatus, comprising:
   a battery chamber arranged to house therein a secondary battery having a jack; and
   a lid arranged to close an insertion opening from which to insert the secondary battery into said battery chamber,
   wherein said lid having an insertion hole through which to connect a plug for supplying external electric power to the jack of the secondary battery.

8. A camera, comprising:
   a battery chamber arranged to house therein a battery for supplying electric power to said camera, said battery chamber being capable of housing therein, in place of the battery, a coupler having a jack; and
   a lid arranged to close an insertion opening from which to insert the battery or the coupler into said battery chamber,
   wherein said camera having an insertion hole through which to connect a plug for supplying external electric power to the jack of the coupler.

9. A camera, comprising:
   a battery chamber arranged to house therein a battery for supplying electric power to said camera, said battery chamber being capable of housing therein, in place of the battery, a secondary battery having a jack; and
   a lid arranged to close an insertion opening from which to insert the battery or the secondary battery into said battery chamber,
   wherein said camera having an insertion hole through which to connect a plug for supplying external electric power to the jack of the secondary battery.

10. A camera, comprising:
    a battery chamber arranged to house therein a battery for supplying electric power to said camera, said battery chamber being capable of housing therein, in place of the battery, a coupler having a jack; and
    a lid arranged to close an insertion opening from which to insert the battery or the coupler into said battery chamber,
    wherein said lid having an insertion hole through which to connect a plug for supplying external electric power to the jack of the coupler.

11. A camera, comprising:
    a battery chamber arranged to house therein a battery for supplying electric power to said camera, said battery chamber being capable of housing therein, in place of the battery, a secondary battery having a jack; and
    a lid arranged to close an insertion opening from which to insert the battery or the secondary battery into said battery chamber,
    wherein said lid having an insertion hole through which to connect a plug for supplying external power to the jack of the secondary battery.

12. A camera, comprising:
    a chamber arranged to house therein a coupler having a jack; and
    a lid arranged to close an insertion opening from which to insert the coupler into said chamber,
    wherein said lid having an insertion hole through which to connect a plug for supplying external electric power to the jack of the coupler.

13. A camera, comprising:

a battery chamber arranged to house therein a secondary battery having a jack; and a lid arranged to close an insertion opening from which to insert the secondary battery into said battery chamber, wherein said lid having an insertion hole through which to connect a plug for supplying external electric power to the jack of the secondary battery.

* * * * *